June 26, 1962 J. VERDERBER 3,041,063
FLUID-ACTUATED CLAMPING APPARATUS
Filed April 19, 1960 5 Sheets-Sheet 1

INVENTOR.
JOSEPH VERDERBER
BY Isler & Ornstein
ATTORNEYS

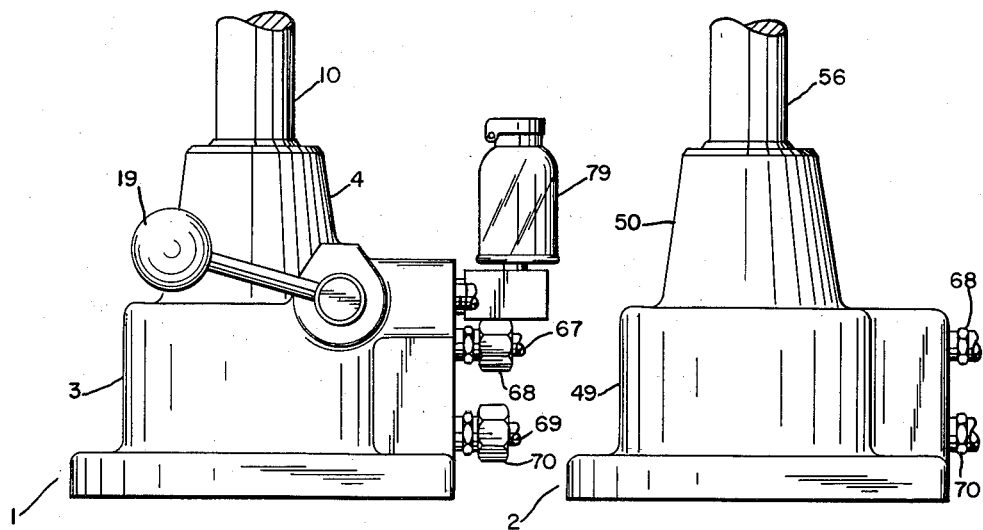
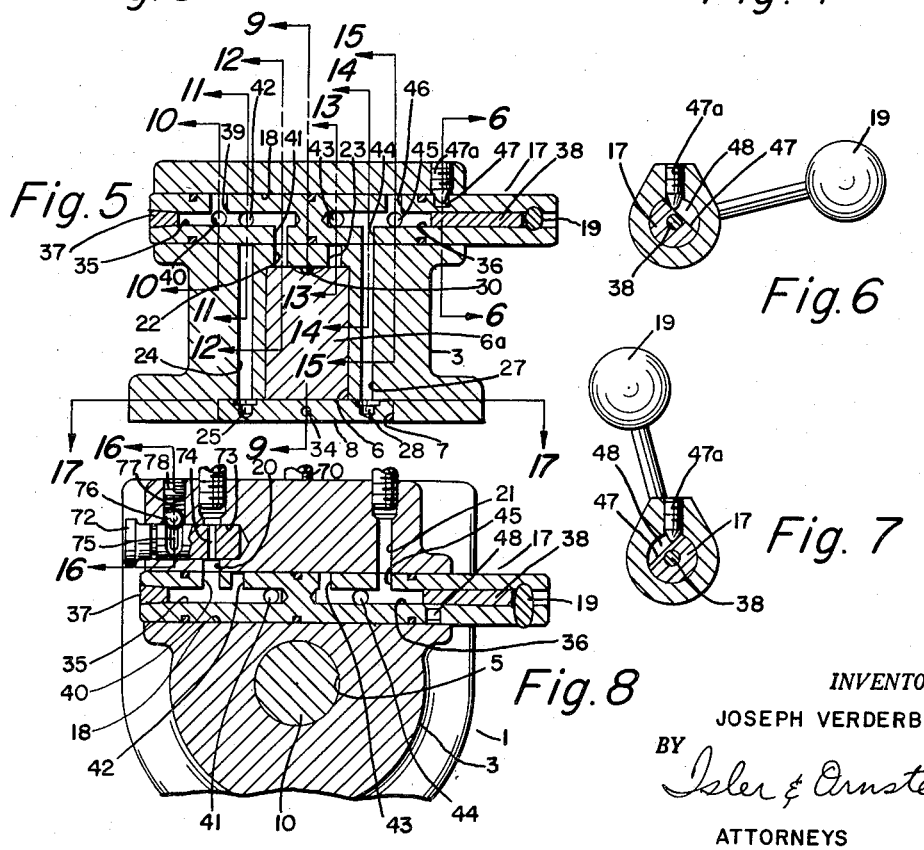

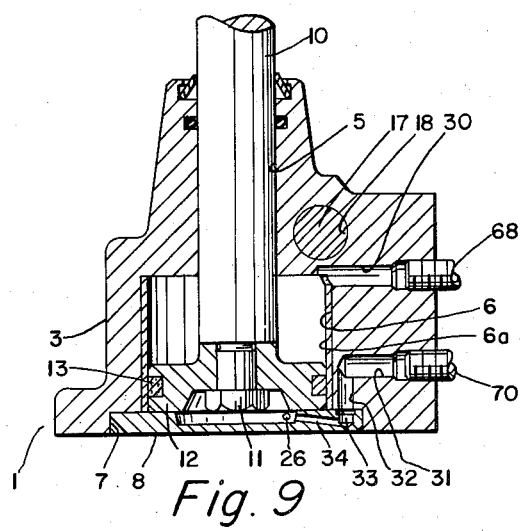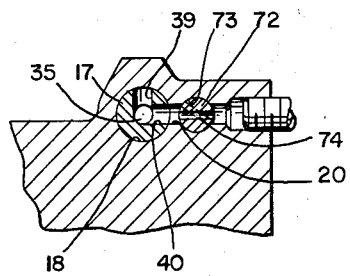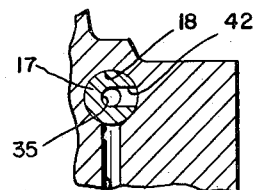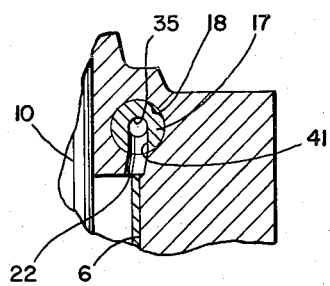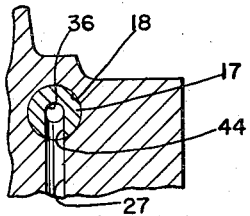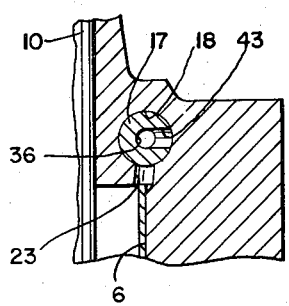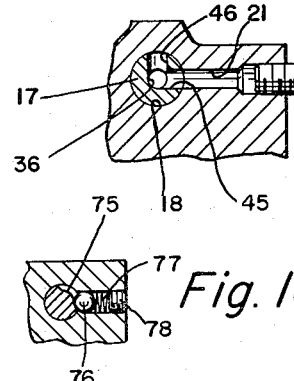

June 26, 1962      J. VERDERBER      3,041,063
FLUID-ACTUATED CLAMPING APPARATUS
Filed April 19, 1960      5 Sheets-Sheet 4
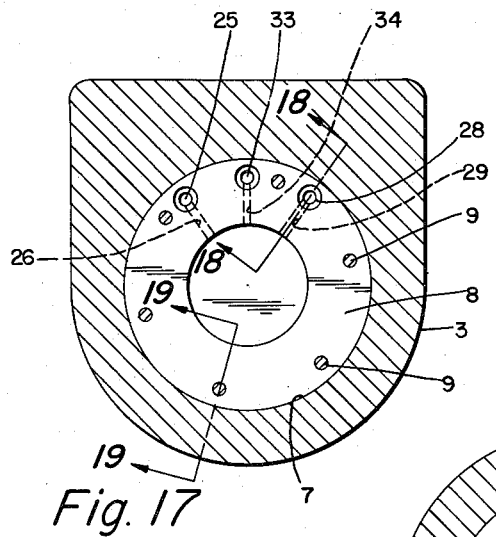
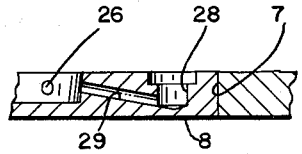
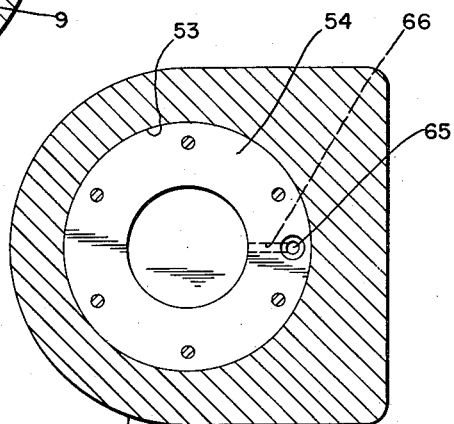
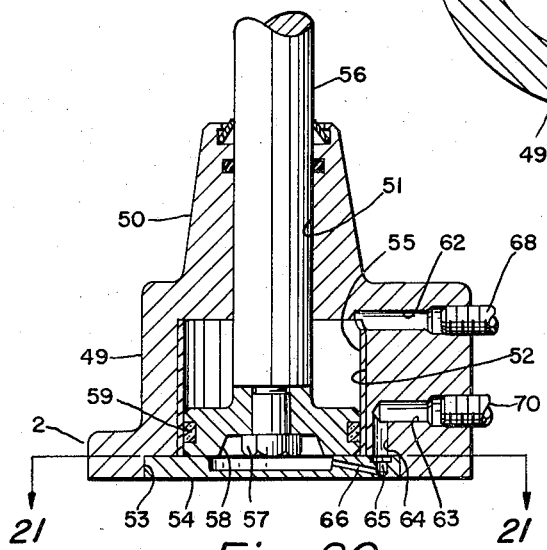
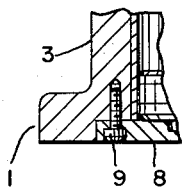
INVENTOR.
JOSEPH VERDERBER
BY
ATTORNEYS

INVENTOR.
JOSEPH VERDERBER
BY

ATTORNEYS

United States Patent Office 3,041,063
Patented June 26, 1962

1

3,041,063
FLUID-ACTUATED CLAMPING APPARATUS
Joseph Verderber, 15255 Lake Shore Blvd., Cleveland, Ohio
Filed Apr. 19, 1960, Ser. No. 23,319
1 Claim. (Cl. 269—26)

This invention relates generally to clamping apparatus, but has reference more particularly to apparatus of this character which is actuated by fluid means.

In my copending application, Serial No. 725,695, filed April 1, 1958, now abandoned, there is disclosed a clamping device, in which air is supplied simultaneously to laterally-spaced cylinders, but in which the cylinders are in fixed relationship to each other, so that the use of the device is limited to a fixed span.

Moreover, the device is provided with a base or platform which is an integral part of the device, and is limited as to its effective clamping area.

The present invention has as its primary object the provision of apparatus of the above-described character, in which simultaneous clamping unclamping is effected through laterally-spaced cylinders, the distance between or clamping span of which, may be easily and quickly varied, so that the utility of the apparatus for clamping work of varying size or length is greatly increased.

Another object of the invention is to provide a clamping apparatus of the character described in which the provision of a base or platform as an integral part of the apparatus is rendered unnecessary, and the effective clamping area is greatly increased. Moreover, the use of the apparatus enables the work table or platform of the machine tool or index table to be utilized directly as a clamping surface, thereby reducing the cost of the clamping apparatus.

A further object of the invention is to provide a clamping apparatus of the character described, in which flexible conduits are provided for interconnecting the laterally-spaced cylinders, which conduits are relatively inexpensive and easily cut and installed, so that variation of the length of the span between the cylinders can be effected by merely substituting conduits of different length between the cylinders.

A still further object of the invention is to provide a clamping apparatus of the character described, in which three or more cylinders may be spaced apart any desired distance, and air supplied simultaneously to all of the cylinders. With such an arrangement, it becomes possible to clamp a number of separate or individual workpieces simultaneously to a clamping surface, such as an index table or other work support.

Other objects and advantages of my invention will be apparent during the course of the following description.

In the accompanying drawings forming a part of this specification, and in which like numerals are employed to designate like parts throughout the same, FIG. 1 is a plan view of clamping apparatus, embodying the invention;

FIG. 3 is a fragmentary side elevational view of the right side clamping device of FIG. 2, as viewed from the right side of the device;

FIG. 4 is a fragmentary side elevational view of the

Figures 1, 2:
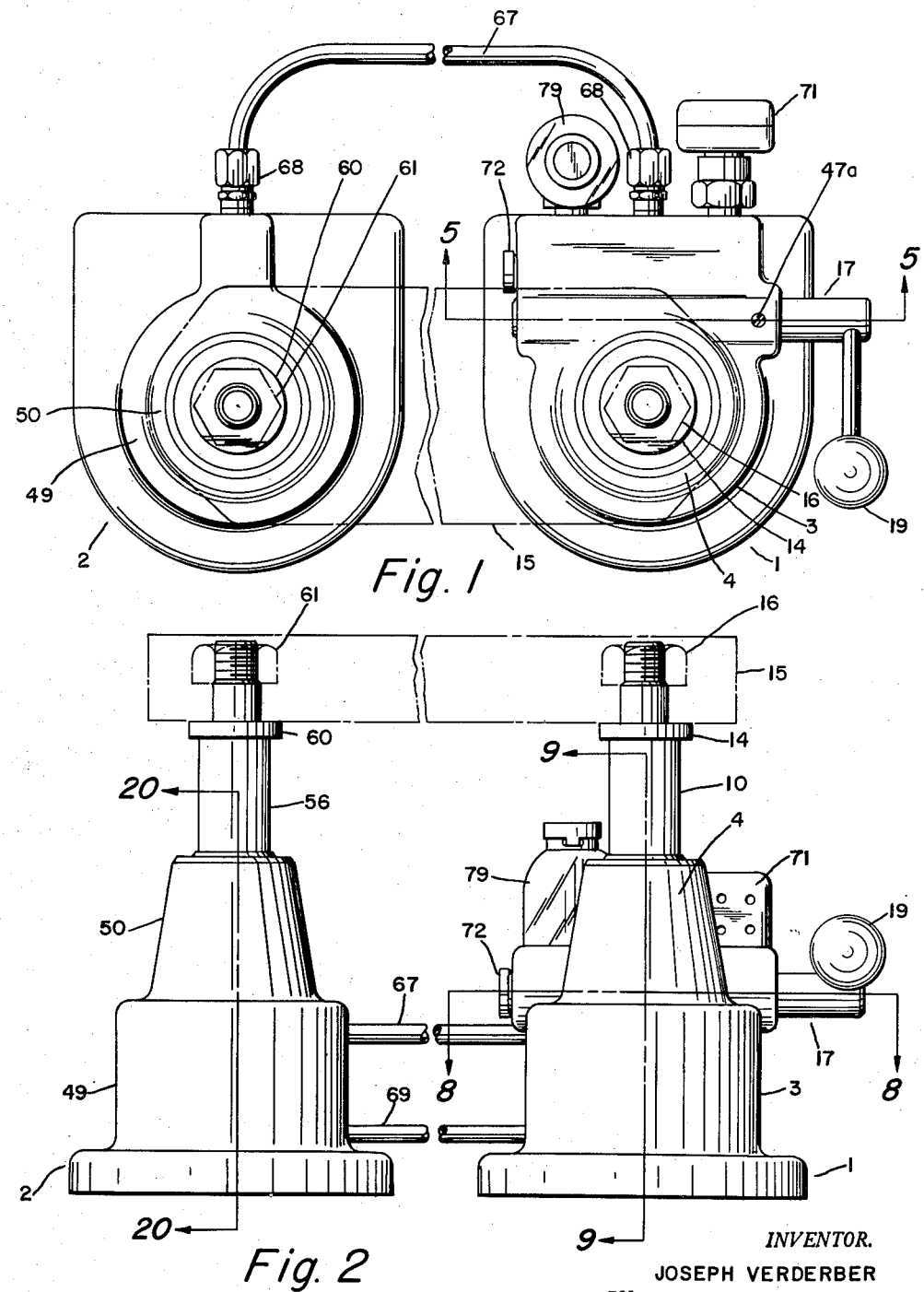
FIG. 2 is a front elevational view of the apparatus shown in FIG. 1.
Figure 22:
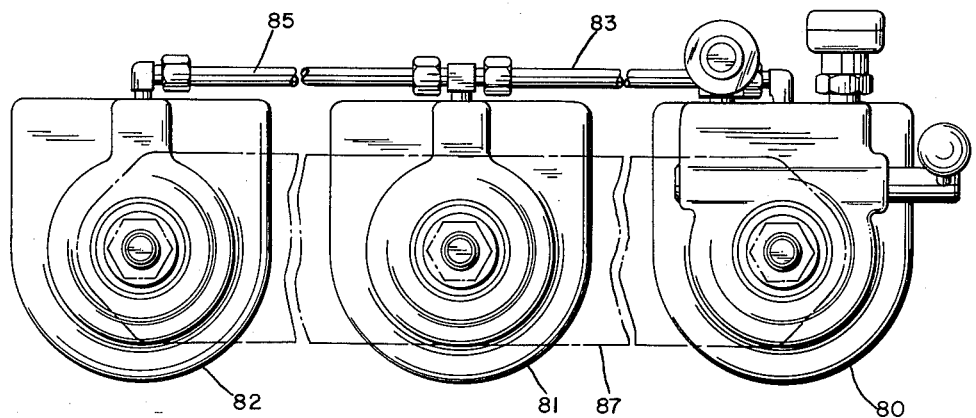
Figure 23:
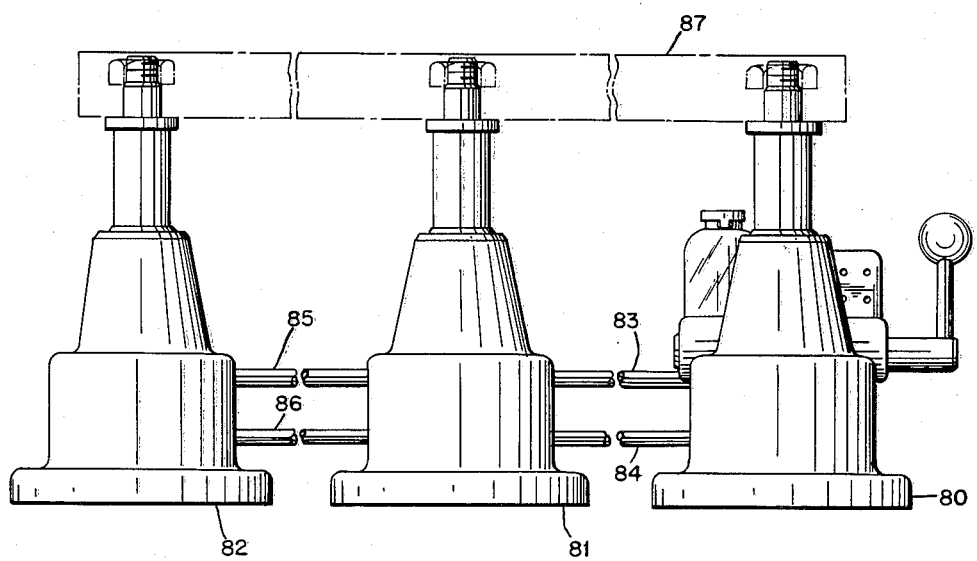

2 left side clamping device of FIG. 2, as viewed from the right side of the device;

FIG. 5 is a vertical cross-sectional view, taken on the line 5—5 of FIG. 1, with the air control valve in position to effect the clamping action;

FIG. 6 is a cross-sectional view, taken on the line 6—6 of FIG. 5;

FIG. 7 is a view similar to FIG. 6, but with the air control valve in position to effect unclamping or release of the work;

FIG. 8 is a horizontal cross-sectional view, taken on the line 8—8 of FIG. 2;

FIG. 9 is a fragmentary vertical cross-sectional view, taken on the line 9—9 of FIGS. 2 and 5;

FIG. 10 is a fragmentary cross-sectional view, taken on the line 10—10 of FIG. 5;

FIG. 11 is a fragmentary cross-sectional view, taken on the line 11—11 of FIG. 5;

FIG. 12 is a fragmentary cross-sectional view, taken on the line 12—12 of FIG. 5;

FIG. 13 is a fragmentary cross-sectional view, taken on the line 13—13 of FIG. 5;

FIG. 14 is a fragmentary cross-sectional view, taken on the line 14—14 of FIG. 5;

FIG. 15 is a fragmentary cross-sectional view, taken on the line 15—15 of FIG. 5;

FIG. 16 is a fragmentary cross-sectional view, taken on the line 16—16 of FIG. 8;

FIG. 17 is a horizontal cross-sectional view, taken on the line 17—17 of FIG. 5;

FIG. 18 is a fragmentary cross-sectional view, taken on the line 18—18 of FIG. 17;

FIG. 19 is a fragmentary cross-sectional view, taken on the line 19—19 of FIG. 17;

FIG. 20 is a fragmentary vertical cross-sectional view, taken on the line 20—20 of FIG. 2;

FIG. 21 is a horizontal cross-sectional view, taken on the line 21—21 of FIG. 20;

FIG. 22 is a view similar to FIG. 1, but showing a modified clamping arrangement, and FIG. 23 is a view similar to FIG. 2, but of the modified clamping arrangement of FIG. 22.

Referring more particularly to FIGS. 1 to 21 inclusive of the drawings, there is illustrated a pair of spaced clamping devices, generally designated by reference numerals 1 and 2, each made from a cast-iron casting or the like, these devices being generally alike in appearance, with the exceptions to be noted below.

The device 1 comprises a base 3, from which a standard 4 projects vertically upward and through which a bore 5 extends. The bore 5 is counterbored as at 6 to provide a cylinder, and the bore 6 is further counterbored as at 7, for the reception of a cap 8, which closes the lower end of the cylinder 6, and is removably secured to the base 3, as by screws 9. The cylinder 6 is provided with a liner 6a.

Slidably mounted in the bore 5 is a plunger 10, having secured to the lower end thereof, as by a nut 11, a piston head 12. The piston head 12 is movable in the liner 6a, between clamping and unclamping positions, and is provided with a piston ring 13.

The plunger 10 is provided at its upper end with a flange 14 which provides a support for a clamping plate or top plate 15, of suitable size and form, which plate is clamped to the flange 14 by means of a nut 16 which is threadedly secured to the upper end of the plunger 10.

For the purpose of admitting air, under pressure, into the cylinder 6, in order to actuate the piston head 12, the device 1 is provided with a series of passageways, which are interconnected by a control valve, generally designated by reference numeral 17, which is rotatably mounted in a horizontal bore or cylinder 18 which extends transversely through the device 1, and is actuated by a handle 19, secured to one end of the valve. The construction and function of this control valve will be described after the air passageways in the device 1 have been described.

These air passageways include an air inlet passageway 20 (FIGS. 8 and 10) extending horizontally from the rear of the device 1 to the rear of the bore or cylinder 18, and a similar air exhaust passageway 21 (FIGS. 8 and 15), extending horizontally from the rear of the bore or cylinder 18 to the rear of the device 1, the passageways 20 and 21 being in spaced parallel relation to each other.

Extending from the bottom of the bore or cylinder 18, vertically downward through the device, so as to communicate with the upper end of the cylinder 6 is a short passageway 22 (FIGS. 5 and 12). A similar passageway 23 (FIGS. 5 and 13), in spaced parallel relation to the passageway 22, extends from the bottom of the bore or cylinder 18 vertically downward through the device, so as to communicate with the upper end of the cylinder 6.

A long passageway 24 (FIGS. 5 and 11) extends vertically downward through the device from the bottom of the bore or cylinder 18 to the cap 8, where it communicates with a passageway 25 in the cap (FIGS. 5 and 17), the passageway 25 communicating, in turn, with the lower end of the cylinder 6 through a passageway 26.

A similar passageway 27 (FIGS. 5 and 14), parallel with the passageway 24, extends vertically downward through the device from the bottom of the bore or cylinder 18 to the cap 8, where it communicates with a passageway 28 in the cap (FIGS. 5, 17 and 18), the passageway 28 communicating, in turn, with the lower end of the cylinder 6 through a passageway 29.

The device is further provided with a pair of vertically-spaced passageways 30 and 31 (FIGS. 5 and 9). The passageway 30 extends horizontally and rearwardly from the upper end of cylinder 6, and the passageway 31 extends horizontally from the rear of the device to the upper end of a vertical passageway 32 in the device (FIGS. 9 and 17), which passageway extends to the cap 8, where it communicates with a passageway 33 in the cap, the passageway 33 communicating, in turn, with a passageway 34 in the cap (FIGS. 5 and 17). The passageway 34 communicates with the lower end of the cylinder 6.

The control valve 17 has a pair of axially-extending, axially-aligned passageways 35 and 36 (FIGS. 5 and 8) therein. The outer end of the passageway 35 is closed by means of a taper pin 37, and the outer end of the passageway 36 is closed by means of a taper pin 38.

Extending radially from the passageway 35 is an inlet bore 39, a second inlet bore 40 spaced circumferentially 90 degrees from the bore 39 and in the same diametral plane as the latter, an outlet bore 41 spaced from the bore 39 and circumferentially 180 degrees from the latter, and a second outlet bore 42 intermediate the bores 40 and 41 and parallel with the bore 40.

Extending radially from the passageway 36 is an outlet bore 43, parallel with the bores 40 and 42, a second outlet bore 44 parallel with the bore 41 and spaced axially from the bore 43, a third outlet bore 45, parallel with the bore 43 and spaced axially from the bores 43 and 44, and a fourth outlet bore 46, parallel with the bore 39 and in the same diametral plane as the bore 45.

The control valve 17 is rotatable by means of the handle 19 between two extreme positions, at one of which a clamping action of the top plate 15 occurs, and at the other of which the top plate 15 is released. These positions are determined by the engagement of a flat surface 47 (FIGS. 5, 6, 7 and 8) of the valve with a dog point set screw 47a which is secured in the device 1 and extends into the recess 48 of the valve, the bottom of which recess forms the surface 47. The screw 47a also serves to lock the control valve against axial displacement from its operative position.

The clamping device 2 comprises a base 49 from which a standard 50 projects vertically upward and through which a bore 51 (FIG. 20) extends. The bore 51 is counterbored as at 52 to provide a cylinder, and the bore 52 is further counterbored as at 53, for the reception of a cap 54, which closes the lower end of the cylinder 52 and is removably secured to the base 49, as by screws similar to the screws 9. The cylinder 52 is provided with a liner 55.

Slidably mounted in the bore 51 is a plunger 56, having secured to the lower end thereof, as by a nut 57, a piston head 58. The piston head 58 is movable in the liner 55, between clamping and unclamping positions, and is provided with a piston ring 59.

The plunger 56 is provided at its upper end with a flange 60 which provides a support for the clamping plate or top plate 15, which plate is clamped to the flange 60 by means of a nut 61 which is threadedly secured to the upper end of the plunger 56.

For the purpose of admitting air, under pressure, into the cylinder 52, in order to actuate the piston head 58, the device 2 is provided with a passageway 62 (FIG. 20) which extends from the rear of the device to the upper end of the cylinder 52, and with a second passageway 63, which is spaced vertically from the passageway 62 and extends from the rear of the device to the upper end of a passageway 64 which extends vertically downward through the device to the cap 54, where it communicates with a passageway 65 in the cap (FIGS. 20 and 21), the passageway 65 communicating, in turn, with the lower end of the cylinder 52 through a passageway 66.

The passageway 30 in the device 1 is interconnected with the passageway 62 in the device 2 by means of a flexible conduit 67, which is preferably made of a clear plastic, the conduit 67 being connected to the respective devices by means of conventional fittings 68.

The passageway 31 in the device 1 is similarly interconnected with the passageway 63 in the device 2 by means of a flexible conduit 69 which is preferably made of a clear plastic, the conduit 69 being connected to the respective devices by means of conventional fittings 70.

The operation of the apparatus may now be described as follows:

With the control valve in the "clamping" position, as shown in FIGS. 5 and 8, air flows from inlet passageway 20 through port 40, passageway 35, port 41, and passageway 22 into the upper end of the cylinder 6. The air entering the cylinder acts on the piston head 12 to force the plunger 10 to the position shown in FIG. 9, thereby causing the top plate 15 to clamp work to a table or other support on which the devices 1 and 2 are mounted or to which they are removably secured. Simultaneously with the aforesaid action, some of the air passes from the cylinder 6 through passageway 30, conduit 67, passageway 62 and into the uper end of the cylinder 52. This air acts on the piston head 58 to force the plunger 56 to the position shown in FIG. 20, thereby causing the plunger to assist the plunger 10 in moving the top plate 15 to clamp the work to the table or other support on which the devices 1 and 2 are mounted.

At the same time that the air is introduced into the cylinder 6 and 52 to actuate the top plate 15, air is forced out of these cylinders by the downward movement of the piston heads in these cylinders, as follows:

The air which is forced out of the cylinder 6 by the piston head 12 leaves the cylinder, enters the passageway 29, and passes through passageways 28, 27, port 44, passageway 36, port 45, and into the exhaust passageway 21. The exhaust air, issuing from the passageway 21, may be muffled by a muffler 71 (FIG. 1). The air which is forced out of the cylinder 52, by the piston head 58 leaves the cylinder, enters the passageway 66, and passes through passageways 65, 64, 63, conduit 69, passageways 31, 32, 33, 34 and out through passageway 29, along with the air exhausted from the cylinder 6.

With the control valve in the "unclamping" position, as shown in FIG. 7, air flows from inlet passageway 20 through port 39, passageway 35, port 42, and passageways 24, 25 and 26 into the lower end of the cylinder 6. The air entering the cylinder acts on the piston head 12 to force the plunger 10 upward, thereby causing the top plate 15 to release or unclamp work which has been clamped to the table or other support on which the devices 1 and 2 are mounted or to which they have been removably secured. Simultaneously with the aforesaid action, some of the air passes from the cylinder 6 through passageways 34, 33, 32 and 31, conduit 69, and passageways 63, 64, 65 and 66, into the lower end of the cylinder 52. This air acts on the piston head 58 to force the plunger 56 upward, thereby causing the plunger to assist the plunger 10 in moving the top plate 15 to release or unclamp the work which has been clamped to the table or other support on which the devices 1 and 2 are mounted.

The air which is forced out of the cylinder 6 by the upward movement of the piston head 12 leaves the cylinder, enters passageway 23, and passes through port 43, passageway 36, port 46, and into the exhaust passageway 21. The air which is forced out of the cylinder 52 by the upward movement of the piston head 58, passes out of the cylinder through passageway 62, conduit 67, passageway 30, cylinder 6, passageway 23, port 43, passageway 36, port 46, and into the exhaust passageway 21.

Means have also been provided for controlling the speed of movement of the plungers 10 and 56, and thereby the speed of the clamping and unclamping action. Such means is best illustrated in FIGS. 1, 8, 10 and 16 of the drawings, and comprises a valve 72 which is disposed in a horizontal bore 73 of the device 1. This valve is provided with a passageway 74 extending diametrically therethrough, which passageway is adapted to be aligned with the inlet passageway 20 (see FIGS. 8 and 10), and when thus aligned, the maximum volume of air passes through the passageway 20, and a maximum speed of movement of the plungers 10 and 56 is effected.

The valve 72 may be rotated to a position in which the passageway 74, as shown in broken lines in FIG. 10, is partially closed by the wall of the bore 73, so that a smaller volume of air is permitted to pass through the passageway 20, and a half speed of movement of the plungers 10 and 56 is effected.

For the purpose of maintaining the valve 72 in its proper axial position and against axial displacement, the valve is provided with an arcuate recess or groove 75, as best shown in FIGS. 8 and 16, and a ball 76 is resiliently urged into this recess, as by a compression coil spring 77, retained against the ball by a set screw 78. The ends of the recess 75 form stops which, when engaged by the ball 76, determine the two positions of the valve 72, which are shown in FIG. 10.

Means have also been provided for automatically lubricating the bore 18 as well as the walls of the liners 6a and 55, so that the parts which are movable in the bore and liners are movable in a frictionless manner, thereby greatly facilitating the speed of operation of the apparatus.

For this purpose, an oiler 79 is provided, which supplies oil to the inlet passageway 20, in a manner such that each time that air is admitted into the passageway 20, a drop of oil is sucked into this passageway, and becomes atomized by the air, so as to cause it to coat the walls of the bore and liners to which reference has been made. Such a lubricating device, and its manner of operation is disclosed in my U.S. Patent No. 2,913,941.

It is thus seen that I have provided an apparatus in which simultaneous clamping and unclamping is effected, through spaced cylinders, the distance between or clamping span of which, may be quickly and easily varied through the simple and inexpensive expedient of removing the top plate 15, and conduits 67 and 69, and substituting for these other top plates and conduits of any desired length. In this manner, the utility of the apparatus for clamping work of varying size or length is greatly increased.

Through the use of such an apparatus, the provision of a base or platform as an integral part of the apparatus is rendered unnecessary, and the effective clamping area is greatly increased. Thus, the use of the apparatus enables the work table or platform of the machine tool, or index table, to be utilized directly as a clamping surface, thereby reducing the cost of the clamping apparatus. In such case, the spaced devices can be clamped, bolted, or otherwise removably secured to such work table, platform, or index table.

The use of flexible interconnecting air conduits, which can be made of clear plastic or the like, is highly advantageous, because these are relatively inexpensive and can be easily cut to any desired length, and quickly installed.

In FIGS. 22 and 23, there is illustrated apparatus which can be used for clamping work of unusual length, by means of a single top plate or clamping plate.

In such apparatus, three or more clamping devices may be used, including a master device 80, which is similar, in all respects, to the device 1 which has been described, and auxiliary clamping devices 81 and 82, which are similar, in all respects, to the device 2 which has been described. In this arrangement, the device 81 is interconnected with the device 80, by means of flexible conduits 83 and 84, and the device 81 is interconnected with the device 82, by means of flexible conduits 85 and 86.

When the device 80 is energized to effect clamping or unclamping action of the top plate 87, the devices 81 and 82 are simultaneously energized for these purposes, in a manner which has already been described.

It is to be understood that the form of my invention, herewith shown and described, is to be taken as a preferred example of the same, and that various changes may be made in the shape, size and arrangement of parts thereof, without departing from the spirit of the invention or the scope of the subjoined claim.

Having thus described my invention, I claim:

A multi-unit assembly adapted to be detachably secured to a work surface, said assembly comprising:

(1) plural fluid motors, each said motor comprising a
  A. cylindrical device closed at the bottom, said bottom including
    (a) means for detachably securing said motors to said work surface at pre-selected positions, and
  B. a piston and piston rod assembly mounted for reciprocatory movement in said cylidnder,
(2) a clamping plate, said plate
  A. adapted to be secured to said piston rods and
  B. being of a predetermined size and configuration selected to span at least a portion of a particular work piece whereby movement of said piston rods imparts reciprocatory movement to said plate to effect clamping and unclamping action between said plate and said surface,
(3) means for supplying fluid under pressure to said motors,
(4) means integrally joined with one of said motors for controlling the flow of fluid to and from its associated motor, said means including
  A. a control means extending from a side of said one motor, and
(5) means interconnecting said motors for causing said fluid to flow from said one motor to the other said motors, said means comprising A. flexible conduits of a predetermined length adapted to span the selected spacing of said fluid motors and to avoid interference with said work piece, said conduits (a) extending form a point on the side of said one motor circumferentially spaced approximately 90° from said control means and being connected to a corresponding point on the other of said motors.

References Cited in the file of this patent

UNITED STATES PATENTS

| | | |
|---|---|---|
| 1,873,818 | Burns | Aug. 23, 1932 |
| 2,182,154 | Lancaster | Dec. 5, 1939 |
| 2,533,413 | Williams | Dec. 12, 1950 |
| 2,623,560 | Joseph | Dec. 30, 1952 |
| 2,663,339 | Verderber | Dec. 22, 1953 |
| 2,675,037 | Iglesias | Apr. 13, 1954 |
| 2,767,458 | Meier | Oct. 23, 1956 |
| 2,796,095 | Joseph | June 18, 1957 |